US009120579B2

(12) United States Patent
De Smet et al.

(10) Patent No.: US 9,120,579 B2
(45) Date of Patent: Sep. 1, 2015

(54) UNMANNED AIRCRAFT WITH FAILSAFE SYSTEM

(71) Applicant: Gatewing NV, Ghent (BE)

(72) Inventors: Bjorn De Smet, Oostrozebeke (BE); Maarten De Moor, Ghent (BE); Peter Cosyn, Zarlardinge (BE)

(73) Assignee: Gatewing NV, Ghent (BE)

( * ) Notice: Subject to any disclaimer, the term of this patent is extended or adjusted under 35 U.S.C. 154(b) by 83 days.

(21) Appl. No.: 14/221,126

(22) Filed: Mar. 20, 2014

(65) Prior Publication Data

US 2015/0053824 A1    Feb. 26, 2015

(30) Foreign Application Priority Data

Aug. 21, 2013   (EP) .................................... 13181174

(51) Int. Cl.

| B64D 31/06 | (2006.01) |
|---|---|
| G05D 1/06 | (2006.01) |
| B64C 39/00 | (2006.01) |
| G05D 1/00 | (2006.01) |
| B64C 11/00 | (2006.01) |

(52) U.S. Cl.
CPC .............. B64D 31/06 (2013.01); B64C 11/002 (2013.01); B64C 39/00 (2013.01); G05D 1/0055 (2013.01); G05D 1/0676 (2013.01); B64C 2201/021 (2013.01); B64C 2201/028 (2013.01); B64C 2201/104 (2013.01); B64C 2201/108 (2013.01); B64C 2201/165 (2013.01); B64C 2201/18 (2013.01); B64C 2700/6267 (2013.01)

(58) Field of Classification Search
USPC ................. 244/182, 183, 186, 188, 189, 190, 244/110 B; 701/3, 16, 99
See application file for complete search history.

(56) References Cited

U.S. PATENT DOCUMENTS

| 2,663,520 | A | * | 12/1953 | Moseley | 244/188 |
|---|---|---|---|---|---|
| 3,730,459 | A | * | 5/1973 | Zuck | 244/48 |
| 4,804,155 | A |   | 2/1989 | Strumbos | |
| 5,340,057 | A | * | 8/1994 | Schmittle | 244/48 |
| 5,395,073 | A | * | 3/1995 | Rutan et al. | 244/48 |
| 5,560,568 | A | * | 10/1996 | Schmittle | 244/48 |
| 7,367,531 | B2 | * | 5/2008 | Greene | 244/195 |

(Continued)

FOREIGN PATENT DOCUMENTS

EP    2 607 236 A2    6/2013

OTHER PUBLICATIONS

European Search Report for Application No. 13 18 1174.7, dated Jan. 16, 2014, 4 pages.

*Primary Examiner* — Joseph W Sanderson
(74) *Attorney, Agent, or Firm* — Kilpatrick Townsend & Stockton LLP

(57) ABSTRACT

An unmanned aircraft configured to fall or crash in a controlled and safe manner. The unmanned aircraft includes a drive system to thrust the unmanned aircraft during a flight, and a reverse thrust system to reverse thrust the unmanned aircraft during a landing. The unmanned aircraft further includes a controller operationally coupled to the reverse thrust system, and a detector to detect and notify to the controller that the unmanned aircraft is in an uncontrolled situation during the flight. The controller is adapted to activate the reverse thrust system in order to reverse thrust the unmanned aircraft in-flight upon notification from the detector that the unmanned aircraft is in an uncontrolled situation.

9 Claims, 3 Drawing Sheets

(56) References Cited

U.S. PATENT DOCUMENTS

| | | | |
|---|---|---|---|
| 7,370,836 B2* | 5/2008 | Greene | 244/195 |
| 8,800,936 B2* | 8/2014 | Cowley et al. | 244/188 |
| 2001/0048050 A1 | 12/2001 | Grieser | |
| 2007/0034071 A1* | 2/2007 | Greene | 89/1.11 |
| 2007/0034072 A1* | 2/2007 | Greene | 89/1.11 |
| 2008/0308681 A1* | 12/2008 | Wilson et al. | 244/182 |
| 2010/0083631 A1* | 4/2010 | Foster et al. | 60/39.15 |
| 2012/0181388 A1 | 7/2012 | Cowley | |

* cited by examiner

UNMANNED AIRCRAFT WITH FAILSAFE SYSTEM

CROSS REFERENCE TO RELATED APPLICATIONS

This application claims priority to European Patent Application No. EP13181174.7, filed Aug. 21, 2013, the entire contents of which are hereby incorporated herein by reference in their entirety for all purposes.

FIELD OF THE INVENTION

The present invention generally relates to unmanned aircraft. Unmanned aircraft are used in a variety of applications such as military applications or image acquisition applications like digital terrain modelling, i.e. digital production of topographic maps used for infrastructure planning like mines, volume calculation of large deposits such as dredge deposits, urban construction planning, land reclamation or vegetation monitoring in the agro-industry, etc. The invention in particular concerns an unmanned aircraft with failsafe technology taking control in-flight as soon as the unmanned aircraft is found to be in an uncontrolled situation.

BACKGROUND OF THE INVENTION

Unmanned aircraft typically have a propeller, engine and controller or other drive system that provides thrust to the unmanned aircraft, i.e. a force having a component in the direction of the aircraft's motion. The unmanned aircraft further may have various sensors, such as a speed sensor, altitude sensor, air pressure sensor, etc. whose outputs are used by the controller during a flight.

In case a sensor is no longer working or working erroneously, or in situations where the controller is defect, or in case an actuator driven by the controller is failing, the unmanned aircraft may end up in an uncontrollable situation wherein it continuously accelerates and finally crashes at high speed. In particular for unmanned aircraft that are used in civil neighbourhoods, such uncontrolled crash at high speed is unsafe and therefore unacceptable.

Unmanned aircraft have been developed with technology that brings the unmanned aircraft in a flight termination mode. Manual control is taken on the unmanned aircraft in order to have the unmanned aircraft carry out a safe, spiral-shaped landing. Such flight termination mode however assumes that the unmanned aircraft's speed is still controllable which is not the case when the aircraft is in an uncontrolled situation during a flight.

The flight of an unmanned aircraft that is no longer controllable may alternatively be terminated through use of a parachute. The use of parachutes however requires the presence of a weight and it involves risks: the parachute may not be rolled-up properly and therefore malfunction, the parachute may not completely open, etc.

It is an objective of the present invention to disclose an unmanned aircraft that overcomes the above mentioned problems. More particularly, it is an objective of the present invention to disclose a propeller-driven unmanned aircraft that is able to terminate a flight in a safe, controlled manner when the unmanned aircraft is in an uncontrolled situation wherein for instance its speed is increasing as a result of failing sensors or components, such that the unmanned aircraft no longer crashes at high speed in an uncontrolled manner.

SUMMARY OF THE INVENTION

According to the present invention, the above defined objectives are realized by an unmanned aircraft that includes a drive system able to thrust the unmanned aircraft during a flight, and a reverse thrust system able to reverse thrust the unmanned aircraft during a landing. The unmanned aircraft further includes a controller operatively coupled to the reverse thrust system, and a detector coupled to the controller and adapted to detect and notify to the controller than the unmanned aircraft is in an uncontrolled situation during the flight. The controller is adapted to activate the reverse thrust system in order to reverse thrust the unmanned aircraft in-flight upon notification from the detector that the unmanned aircraft is in an uncontrolled situation.

Thus, the unmanned aircraft according to the present invention detects that it is in an uncontrolled situation and thereupon automatically activates a reverse thrust system in-flight. As a result thereof, the unmanned aircraft shall fall instantly, i.e. within a few seconds, nearly vertically, while its speed is reduced through the reverse thrust system that generates a force with a vertical upward component while the unmanned aircraft is falling. During the controlled fall, the unmanned aircraft shall for instance rotate while maintaining its nose downward directed. Whereas an unmanned aircraft in an uncontrolled situation typically crashes at speeds above 150 kilometers per hour, the unmanned aircraft according to the present invention shall hit the ground at speeds of a few tens, e.g. 40 kilometers per hour. Apart from safety when used in civil neighbourhoods, the unmanned aircraft according to the present invention has the advantage that it will have no or limited damage as a result of which the unmanned aircraft or most of its components are reusable for future flights.

It is noticed that reverse thrust systems in aircraft are known and described.

Reverse thrust, i.e. temporarily reversing the direction of thrust that the aircraft's drive system provides, is used during landing in order to slow-down the aircraft and reduce wear on the brakes, and to enable the aircraft to shorten its landing distance. Usually, reverse thrust cannot be used in-flight. Nevertheless, in particular in military applications, the use of in-flight reverse thrust has been reported, e.g. to enable rapid deceleration or to enable quick speed changes. In general however, in-flight reverse thrust is considered unsafe and therefore not allowed on the majority of aircraft. Contradictory to the assumption that in-flight reverse thrust is unsafe, the unmanned aircraft according to the present invention activates in-flight reverse thrust to allow the unmanned aircraft to fall or crash in a controlled and safe manner whenever the unmanned aircraft ends up in an uncontrollable situation during a flight, e.g. as a result of failing components.

Optionally, the unmanned aircraft according to the present invention further includes a drag increasing system able to increase drag of the unmanned aircraft, wherein the controller is adapted to activate the drag increasing system upon notification from the detector that the unmanned aircraft is in an uncontrolled situation.

Indeed, in order to further decrease the speed of the falling unmanned aircraft, the reverse thrust activation may be accompanied by parallel activation of a drag increasing system. Drag is the aerodynamic force that opposes the aircraft's motion through the air. Several drag increasing systems are known, e.g. flaps or elevators that open. One or more of these drag increasing systems may be integrated in the unmanned aircraft according to the present invention, in which case the controller preferably activates these drag increasing systems when an uncontrolled situation is detected. The unmanned aircraft shall fall nearly vertically at an even lower speed and also the terminal speed achieved by the unmanned aircraft when hitting the ground shall be further reduced when drag increasing is combined with trust reversal. As a consequence, safety of the unmanned aircraft for use in civil neighbourhoods is further increased, and chances that it is possible to reuse the aircraft or components thereof in future flights are also increased.

In accordance with a further optional aspect of the unmanned aircraft according to the present invention, the controller is configured to fixedly reverse thrust the unmanned aircraft upon notification from the detector that the unmanned aircraft is in an uncontrolled situation.

Indeed, whereas the amount of trust reversal is usually variably controlled when reverse thrust is used during landing, a preferred embodiment of the present invention applies a fixed amount of reverse thrust that is dependent on the aircraft and engine configuration, e.g. 80% of the engines capacity, when the unmanned aircraft is detected to be in an uncontrolled situation. In an alternative, more complex to realise embodiment however, a variably controlled reverse thrust based on sensor output diagnose may be applied during the failsafe flight termination mode according to the present invention.

In an embodiment of the unmanned aircraft according to the present invention, the detector comprises one or more sensor and an analyser configured to detect that the unmanned aircraft is in an uncontrolled situation by analysis of output of the one or more sensor.

Hence, the unmanned aircraft according to the present invention may detect an uncontrolled situation fully autonomously by analysing sensor outputs. The uncontrolled situation may be predefined or an adaptive control system could be integrated that defines a state or situation as uncontrollable on the moment the situation happens. The sensor outputs may for instance indicate that an actuator driven by the controller is failing, or that the aircraft's speed is no longer controlled. The detector may for instance further comprise one or more of a speed sensor, an altitude sensor, an air pressure sensor, a static air pressure sensor, a differential air pressure sensor, and a Global Navigation Satellite System or GNSS sensor.

The output of a speed sensor may be used to detect that the unmanned aircraft's speed exceeds a certain upper limit beyond which the reverse thrust based flight termination is activated. Similarly, the output of an altitude sensor may be used to detect a rapid loss or increase of altitude. When the altitude loss or gain sensed within a predetermined time interval exceeds a certain predefined limit, the reverse thrust based flight termination may be activated. A steep loss or gain in altitude may alternatively be detected by analysing the output of a static air pressure sensor, since the air pressure is directly related to the altitude. Just like the altitude sensor, also the speed sensor may be air pressure based. Indeed, the speed may for instance be sensed by a differential air pressure sensor that measures the dynamic air pressure. Further or alternatively, GPS coordinates as sourced by a GPS receiver aboard the unmanned aircraft or coordinates as sourced by any other type of GNSS receiver, may be used to detect an uncontrolled situation. A change in GPS coordinates within a predefined time interval beyond certain predefined thresholds, may indicate that the horizontal or vertical speed of the unmanned aircraft has reached uncontrolled values, again leading to a decision to terminate the flight in a controlled manner using thrust reversal, eventually combined with drag increase. Obviously, a person skilled in the art shall appreciate that the above list of sensors and the above examples of criteria that lead to activation of in-flight trust reversal are non-exhaustive and the present invention is not limited to any particular choice or implementation. Advantageously, the unmanned aircraft according to the invention shall comprise multiple sensors whose outputs shall be analysed through an algorithm combining the various sensor outputs, in order to avoid unnecessary flight terminations resulting for instance from a single failing sensor.

In an alternate embodiment of the unmanned aircraft according to the present invention, the detector comprises a receiver for receiving user information indicating that the unmanned aircraft is in an uncontrolled situation during the flight.

Thus, instead of or in addition to autonomous detection of an uncontrolled situation by the unmanned aircraft, the unmanned aircraft according to the invention may receive information indicative for an uncontrolled situation, e.g. remote instructions or commands from a user who decides to urgently but safely terminate the flight in a controlled manner.

In an embodiment of the unmanned aircraft according to the present invention, the drive system comprises an engine rotatable in two directions, and the reverse thrust system is adapted to change the rotation of the engine to reverse thrust the unmanned aircraft.

Indeed, the reverse thrust based system in one implementation of the present invention may rely on reversing the rotation direction of the engine, for instance driving a propeller. This implementation has the advantages that the engine is used in non-optimal conditions as a result of which the unmanned aircraft shall produce a typical sound during its fall. This typical sound shall warn people in the neighbourhood, and consequently increases the safety.

In an alternate embodiment of the unmanned aircraft according to the present invention, the drive system comprises a variable pitch propeller, and the reverse thrust system is adapted to vary the angle of blades of the variable pitch propeller to a negative angle to reverse thrust the unmanned aircraft.

Indeed, in propeller-driven unmanned aircraft reverse thrust can also be achieved by changing the angle of propeller blades, assuming that a controllable pitch propeller is foreseen.

In addition to an unmanned aircraft, the present invention relates to a corresponding method to safely take an unmanned aircraft out of a flight, the method includes detecting that the unmanned aircraft is in an uncontrolled situation during the flight, reverse thrusting the unmanned aircraft in-flight upon detection that the unmanned aircraft is in an uncontrolled situation, and the unmanned aircraft falling at reduced speed.

DETAILED DESCRIPTION OF EMBODIMENT(S)

Figures 1A, 1B, 1C:
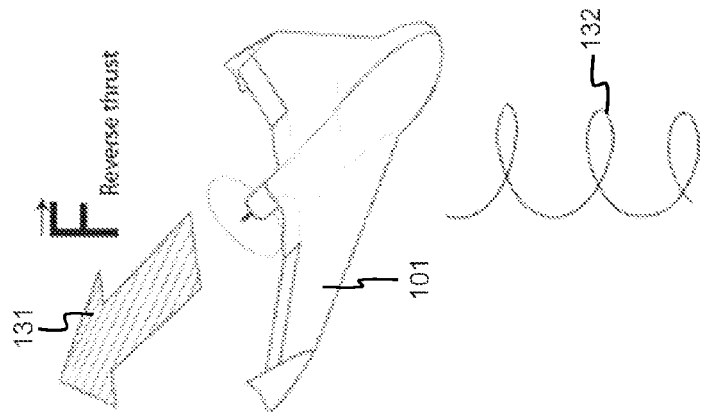
FIGS. 1A-1C illustrate flight termination in an uncontrolled situation of a first embodiment of the unmanned aircraft according to the present invention.

FIGS. 1A-1C show a propeller-driven unmanned aircraft 101 whose propeller 112 is driven by an engine to apply a thrust force, $F_{Thrust}$ or 111, during the flight, as specifically illustrated by FIG. 1A. The unmanned aircraft 101 has a detector aboard that detects when the unmanned aircraft 101 is in an uncontrolled situation. Such uncontrolled situation may for instance result from an inappropriately working sensor, a defective controller controlling the drive mechanism and actuators of the unmanned aircraft 101 or a failing actuator. As a result of the uncontrolled situation, the unmanned aircraft 101 may for instance gain speed or altitude in an uncontrolled manner. The detector recognizes such uncontrolled situation since it analyses the output of one or more sensors, e.g. a speed sensor or altitude sensor, or since it is manually notified by the user of the unmanned aircraft 101 of the uncontrolled situation. Upon detection of the uncontrolled situation, the detector informs a controller aboard the unmanned aircraft 101 to activate a reverse thrust system. As a result, a reverse thrust force, $F_{Reverse\ thrust}$ or 121 is applied to the unmanned aircraft 101, as is illustrated by FIG. 1B. As a consequence of the reverse thrust force, the unmanned aircraft 101 falls down, nearly vertical, usually nose-down and rotating as is indicated by 132 in FIG. 1C, while the reverse thrust force 131 contains a vertically upward directing component that slows down the falling speed of the unmanned aircraft 101.

Figure 2C:
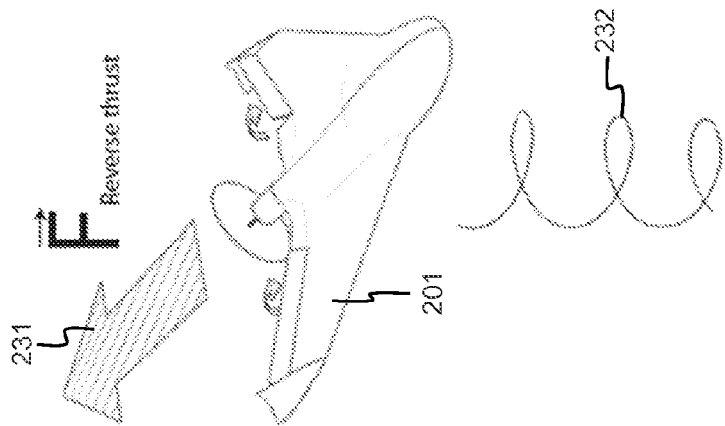
FIGS. 2A-2C illustrate flight termination in an uncontrolled situation of a second embodiment of the unmanned aircraft according to the present invention.
Figure 2B:
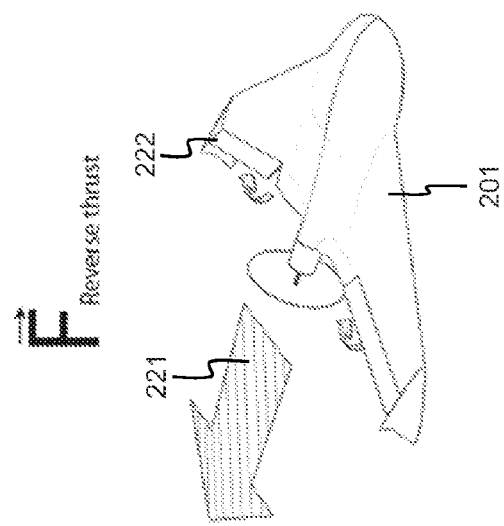
Figure 2A:
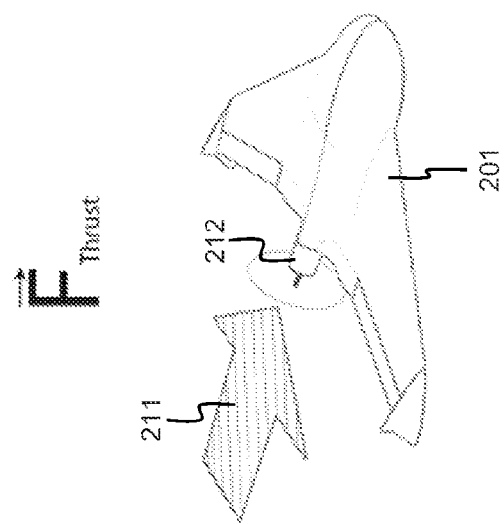

FIGS. 2A-2C show another propeller-driven unmanned aircraft 201 whose propeller 212 is driven by an engine to apply a thrust force, $F_{Thrust}$ or 211, during the flight, as specifically illustrated by FIG. 2A. The unmanned aircraft 201 also has a detector aboard that detects when the unmanned aircraft is in an uncontrolled situation. Again, the uncontrolled situation may result from an inappropriately working sensor, a defective controller controlling the drive mechanism and actuators of the unmanned aircraft 201, or a failing actuator. As a result of the uncontrolled situation, the unmanned aircraft 201 may gain speed or altitude in an uncontrolled manner. The detector recognizes such uncontrolled situation since it analyses the output of one or more sensors, e.g. a speed sensor or altitude sensor, or since it is manually notified by the user of the unmanned aircraft of the uncontrolled situation. Upon detection of the uncontrolled situation, the detector informs a controller aboard the unmanned aircraft 201 to activate a reverse thrust system. As a result, a reverse thrust force, $F_{Reverse\ thrust}$ or 221 is applied to the unmanned aircraft 201, as is illustrated by FIG. 2B. Simultaneously, the controller aboard unmanned aircraft 201 activates a drag increase system that opens flaps 222. As a consequence of the reverse thrust force and the increased drag, the unmanned aircraft 201 falls down, nearly vertical, usually nose-down and rotating as is indicated by 232 in FIG. 2C, while the vertical upward component of the reverse thrust force 231 and the increased drag slow down the falling speed of the unmanned aircraft 201.

Figure 3:
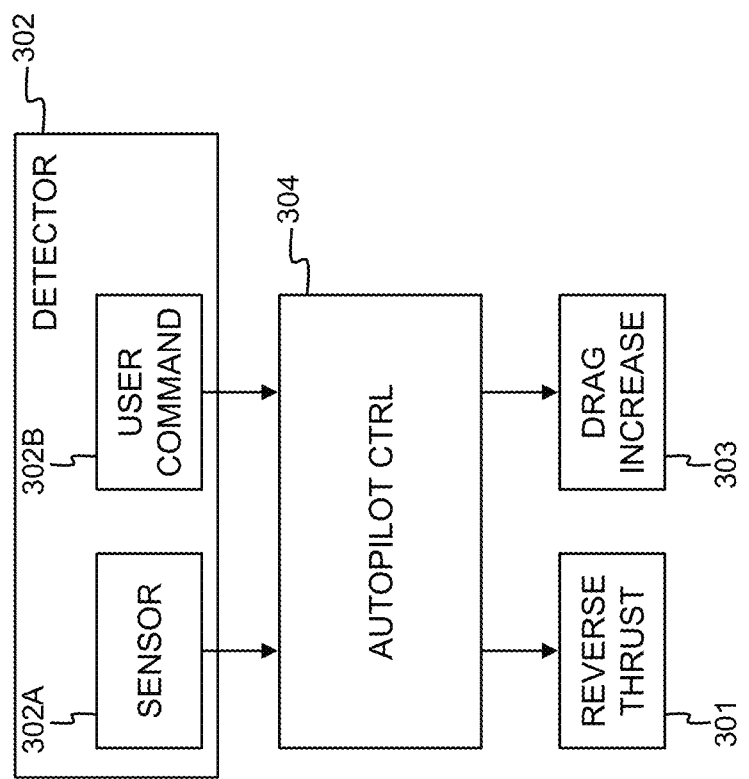
FIG. 3 is a functional block scheme of an embodiment of the unmanned aircraft according to the present invention.

FIG. 3 shows the functional blocks present in the embodiment of the unmanned aircraft 201 of FIG. 2 that enable the invention. The unmanned aircraft 201 comprises a reverse thrust system 301. The reverse thrust system 301 in the example of unmanned aircraft 201 is a bi-directionally rotatable engine that drives propeller 212. When controlled to rotate in forward direction, the engine and propeller 212 shall apply thrust force 211 to the unmanned aircraft 201. When controlled to rotate in reverse direction, the engine and propeller 212 apply reverse thrust force 221 or 231 to the unmanned aircraft 201. When rotating in the reverse direction, the engine shall produce a recognizable sound that further increases safety for humans in the vicinity of the area where the unmanned aircraft 201 will drop. In alternative embodiments, the reverse thrust system 301 may be implemented differently, for instance through a variable pitch propeller whose blade angles can be made negative. The unmanned aircraft 202 further comprises a drag increase system 303. In the example of unmanned aircraft 201, the drag increase system 303 consists of flaps 222 that can be opened to increase drag. In alternative embodiments, the drag increase system 303 may contain or may be supplemented with other elements that increase the drag or aerodynamic force applied to the aircraft. Further, FIG. 3 shows a detector 302 and a controller 304 or AUTOPILOT CTRL. The detector 302 contains one or more sensor 302A and a receiver 302 for receiving and interpreting user commands. Based on the sensor output(s) and/or the received user commands, the detector 302 detects that the unmanned aircraft 202 is in an uncontrolled situation. As soon as this happens, the controller 304 is instructed to activate the reverse thrust system 301 and the drag increase system 303.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:
1. An unmanned aircraft comprising:
  a drive system able to thrust said unmanned aircraft during a flight;
  a reverse thrust system able to reverse thrust said unmanned aircraft during a landing;
  a controller operationally coupled to said reverse thrust system; and
  a detector coupled to said controller and adapted to detect and notify to said controller that said unmanned aircraft is in an uncontrolled situation during said flight,
  wherein said controller is adapted to activate said reverse thrust system in order to reverse thrust said unmanned aircraft in-flight upon notification from said detector that said unmanned aircraft is in an uncontrolled situation.
2. An unmanned aircraft according to claim 1, further comprising:
  a drag increasing system able to increase drag of said unmanned aircraft, wherein said controller is adapted to activate said drag increasing system upon notification from said detector that said unmanned aircraft is in an uncontrolled situation.

3. An unmanned aircraft according to claim 1, wherein said controller is configured to fixedly reverse thrust said unmanned aircraft upon notification from said detector that said unmanned aircraft is in an uncontrolled situation.

4. An unmanned aircraft according to claim 1, wherein said detector comprises one or more sensor and an analyser configured to detect that said unmanned aircraft is in a predefined uncontrolled situation by analysis of output of said one or more sensor.

5. An unmanned aircraft according to claim 4, wherein said detector comprises one or more of:
a speed sensor;
an altitude sensor;
an air pressure sensor;
a static air pressure sensor;
a differential air pressure sensor; and
a Global Navigation Satellite System (GNSS) or GNSS sensor.

6. An unmanned aircraft according to claim 1, wherein said detector comprises a receiver for receiving user information indicating that said unmanned aircraft is in an uncontrolled situation during said flight.

7. An unmanned aircraft according to claim 1, wherein:
said drive system comprises an engine rotatable in two directions; and
said reverse thrust system is adapted to change the rotation of said engine to reverse thrust said unmanned aircraft.

8. An unmanned aircraft according to claim 1, wherein:
said drive system comprises a variable pitch propeller; and
said reverse thrust system is adapted to vary the angle of blades of said variable pitch propeller to a negative angle to reverse thrust said unmanned aircraft.

9. A method to safely take an unmanned aircraft out of a flight, said method comprising:
detecting that said unmanned aircraft is in an uncontrolled situation during said flight; and
reverse thrusting said unmanned aircraft in-flight upon detection that said unmanned aircraft is in an uncontrolled situation so that
said unmanned aircraft falls at reduced speed.

* * * * *